(12) United States Patent
Springer et al.

(10) Patent No.: US 10,902,847 B2
(45) Date of Patent: Jan. 26, 2021

(54) SYSTEM AND METHOD FOR ASSESSING AND CORRECTING POTENTIAL UNDERSERVED CONTENT IN NATURAL LANGUAGE UNDERSTANDING APPLICATIONS

(71) Applicant: Spotify AB, Stockholm (SE)

(72) Inventors: Aaron Springer, Santa Cruz, CA (US); Henriette Cramer, San Francisco, CA (US); Sravana Reddy, Cambridge, MA (US)

(73) Assignee: Spotify AB, Stockholm (SE)

( * ) Notice: Subject to any disclaimer, the term of this patent is extended or adjusted under 35 U.S.C. 154(b) by 215 days.

(21) Appl. No.: 16/124,697

(22) Filed: Sep. 7, 2018

(65) Prior Publication Data
US 2019/0080686 A1 Mar. 14, 2019

Related U.S. Application Data

(60) Provisional application No. 62/557,265, filed on Sep. 12, 2017, provisional application No. 62/567,582, filed on Oct. 3, 2017.

(51) Int. Cl.
| | |
|---|---|
| *G10L 15/187* | (2013.01) |
| *G10L 15/18* | (2013.01) |
| *G10L 15/22* | (2006.01) |
| *G06F 40/295* | (2020.01) |

(52) U.S. Cl.
CPC .......... *G10L 15/187* (2013.01); *G06F 40/295* (2020.01); *G10L 15/1815* (2013.01); *G10L 15/22* (2013.01); *G10L 2015/223* (2013.01)

(58) Field of Classification Search
USPC ..................................................... 704/1–504
See application file for complete search history.

(56) References Cited

U.S. PATENT DOCUMENTS

| | | | | |
|---|---|---|---|---|
| 8,959,020 | B1* | 2/2015 | Strope | G10L 15/187 704/257 |
| 2003/0182111 | A1* | 9/2003 | Handal | G09B 5/04 704/231 |
| 2004/0172258 | A1* | 9/2004 | Dominach | G10L 15/22 704/277 |
| 2006/0206339 | A1* | 9/2006 | Silvera | G11B 27/34 704/278 |

(Continued)

OTHER PUBLICATIONS

Project Common Voice. Mozilla, Sep. 11, 2017. Available Online at: https://voice.mozilla.org/.

*Primary Examiner* — Marcus T Riley
(74) *Attorney, Agent, or Firm* — Merchant & Gould P.C.

(57) ABSTRACT

Methods, systems, and related products that provide detection of media content items that are under-locatable by machine voice-driven retrieval of uttered requests for retrieval of the media items. For a given media item, a resolvability value and/or an utterance resolve frequency is calculated by a number of playbacks of the media item by a speech retrieval modality to a total number of playbacks of the media item regardless of retrieval modality. In some examples, the methods, systems and related products also provide for improvement in the locatability of an under-locatable media item by collecting and/or generating one or more pronunciation aliases for the under-locatable item.

42 Claims, 5 Drawing Sheets

(56) References Cited

U.S. PATENT DOCUMENTS

| | | | | |
|---|---|---|---|---|
| 2011/0276335 A1* | 11/2011 | Silvera | ............... | G11B 27/105 |
| | | | | 704/275 |
| 2013/0179170 A1* | 7/2013 | Cath | ................. | G10L 13/08 |
| | | | | 704/260 |
| 2014/0207468 A1* | 7/2014 | Bartnik | .............. | G10L 15/22 |
| | | | | 704/275 |
| 2014/0222415 A1* | 8/2014 | Legat | ................ | G10L 13/08 |
| | | | | 704/8 |
| 2015/0185964 A1* | 7/2015 | Stout | .............. | H04N 21/47217 |
| | | | | 715/716 |
| 2017/0242653 A1* | 8/2017 | Lang | ................. | H04S 7/303 |
| 2017/0243576 A1* | 8/2017 | Millington | ......... | G10L 15/1822 |
| 2019/0080686 A1* | 3/2019 | Springer | ............ | G06F 40/295 |

* cited by examiner

| Item ID | Name Entity(ies) | Alias(es) | Classification |
|---------|------------------|-----------|----------------|
| XXYYY | <2L8> | Too Late | Alternative Spelling |
| XXYYZ | <TREEFALL> | Tree Fall | Missing Spaces |
| ⋮ | ⋮ | ⋮ | ⋮ |

FIG. 4

SYSTEM AND METHOD FOR ASSESSING AND CORRECTING POTENTIAL UNDERSERVED CONTENT IN NATURAL LANGUAGE UNDERSTANDING APPLICATIONS

CROSS-REFERENCE TO RELATED APPLICATIONS

This application claims the benefit of U.S. Provisional Patent Application No. 62/557,265 filed on Sep. 12, 2017, and U.S. Provisional Patent Application No. 62/567,582 filed on Oct. 3, 2017, the contents of which applications are hereby fully incorporated by reference in their entirety.

TECHNICAL FIELD

The present disclosure relates generally to automatic speech recognition and natural language understanding, and more particularly to improving systems and methods that assess and correct underserved content in automatic speech recognition and natural language understanding applications.

BACKGROUND

Voice and natural language understanding applications rely on being able to understand what a user is saying or typing. Certain types of content/entities are, however, hard to recognize from uttered commands. This includes names containing special characters (emojis, symbols), such as !!! (pronounced 'chik chik chik'), and other names which users may have trouble pronouncing for any of a variety of reasons.

Accessing names of media content items, e.g., by the name of the item or by the name of the artist, can be particularly challenging when the name of the item or artist sounds like another natural language word or words that is/are spelled differently (i.e., spelled conventionally) and that conventionally spelled word is associated with a media content item other than the one that is desired to be accessed. For example, an artist FOCVS goes by the pronunciation "focus". Uttering the word "focus", e.g., in the context of "play my focus tracks" for voice processing by a media playback system therefore may not access the desired content or content by the desired artist, instead retrieving, e.g., content that transcribes exactly to the utterance according to conventional speech to text processing.

Names of tracks or artists that are spelled in unconventional ways or pronounced in unconventional ways, can present additional accessibility challenges in that different users may attempt to access the content using different utterances. For example, one user may search for the term MXMUS by uttering "maximus", while another user utters each letter M-X-M-U-S, and while another user utters "mix music". Different accents and dialects of users making utterance-based searches present a similar and/or compounding of the problem.

U.S. Pat. No. 8,959,020 describes methods and systems for discovery of problematic pronunciations for automatic speech recognition systems, including determining a frequency of occurrences for one or more n-grams in transcribed text and a frequency of occurrences of the n-grams in typed text and classifying a system pronunciation of a word included in the n-grams as correct or incorrect based on the frequencies.

U.S. Pat. Pub. No. 2013/0179170 describes providing validated text-to speech correction hints from aggregated pronunciation corrections received from text-to-speech applications. Crowd sourcing techniques can be used to collect corrections to mispronunciations of words or phrases in text-to-speech applications.

U.S. Pat. Pub. No. 2004/0172258 describes techniques for disambiguating speech input for multimodal systems by using a combination of speech and visual I/O interfaces to correctly identify a user's speech input.

U.S. Pat. Pub. No. 2003/0182111 describes a speech training method. A digital representation of a particular audible sound is compared to the digital representations of known audible sounds to determine which of those known audible sounds is most likely to be the particular audible sound being compared to. In response to a determination of error corresponding to a known type or instance of mispronunciation, a system presents an interactive training program from the computer to the user to enable the user to correct such mispronunciation.

U.S. Pat. Pub. No. 2014/0222415 describes training a classifier that subsequently determines a degree to which a grapheme-to-phoneme algorithm is likely to detect a newly detected out-of-vocabulary word to be converted into an audio representation. Outputs are compared to identify instances in which a lexicon lookup algorithm and a grapheme-to-phoneme algorithm produce different audio representations for the same words.

SUMMARY

The present disclosure provides systems, methods, and computer readable products for detecting media items that are poorly locatable by machine voice-driven retrieval to identify the media item, as well as systems, methods, and computer readable products for improving locatability to such media items using machine voice-driven retrieval to identify the media item. The term "locatability" will sometimes be referred to as "locatability" and will sometimes be referred to as "findability". The disclosures herein provide for improvements in retrieving media content items using uttered requests by identifying under-locatable content and then making that content more accessible.

Generally, an "under-locatable" or "underserved" media content item (or media item) is one that is deemed to be too difficult or too unlikely to locate by machine voice-driven retrieval of a syntactically sufficient utterance designed to locate (e.g., in order to playback) that media content item. If a media content item is not under-locatable then it is "locatable," meaning that it is not too difficult or too unlikely to locate the media content item by machine voice-driven retrieval of a syntactically sufficient utterance designed to locate (e.g., in order to playback) that media content item. More specific definitions of what makes a media content item under-locatable or locatable will be described below in connection with the methods and systems of the present disclosure that identify under-locatable content.

As used herein, a "media content item" includes a single piece of media content (e.g., a track or a television episode or a clip, etc.) or a collection of media content pieces (e.g., an album, a playlist, an entire season or series of episodes of a television show, etc.).

As used herein, the term "syntactically sufficient" means that a command uttered to locate a media content item, e.g., for purposes of playing back that media content item, meets one or more syntactical requirements for causing a locating of the media content item from a repository of media content items to be performed. For example, in some media content playback systems, "Play Desert Cactus by the Acmes" triggers a locating function of the system such that the system locates the track Desert Cactus by the Acmes and prepares that track for playback, while uttering merely "Desert Cactus" does not include the necessary syntax to trigger the desired locating. It should be appreciated that what constitutes a syntactically sufficient utterance can depend on numerous factors.

As used herein a "name entity" or "entity" is a piece of text associated with a media content item used to identify that media content item. It should be understood that the term "text" is used for convenience and may refer to, for example, alpha characters, numeric characters, alphanumeric characters, American Standard Code for Information Interchange (ASCII) characters, symbols, or foreign language unicode (e.g. UTF-8). Thus, a "name entity" includes, e.g., a title of a track or album, the name of an artist or a band, the title of a playlist, etc.

It should be appreciated that, while the following description will be directed to locating media content for playback, the principles of the present disclosure are applicable more broadly to locating any type of content.

The systems, methods, and computer readable products of the present disclosure serve a variety of technical advantages and improvements over existing technologies and, particularly, over existing computer technologies directed to locating of media content items and other items using machine voice-driven retrieval and processing of human speech.

According to certain aspects of the present disclosure, a method for detecting an under-locatable media content item includes: ascertaining a first number of playbacks of the media content item; ascertaining a second number of playbacks of the media content item, where each of the second number of playbacks corresponds to one of the first number of playbacks triggered by a machine voice-driven retrieval of a playback command utterance; and comparing the first number to the second number.

In some examples, each of the first number of playbacks of the media content item corresponds to a playback command provided by any of a plurality of command modalities, where one of the command modalities is user utterance (i.e., natural speech) and another of the command modalities is user-entered text.

In some examples, the method further includes calculating, from the comparison (i.e., the comparing step), an utterance resolve frequency of the media content item; comparing the utterance resolve frequency to a predefined threshold frequency; and, if the utterance resolve frequency is less than the predefined threshold frequency, determining that the media content item is under-locatable.

In some examples, the method further includes calculating, from the comparison (i.e., the comparing step), an utterance resolvability value of the media content item; comparing the resolvability value to a predefined threshold resolvability; and, if the utterance resolvability value is less than the predefined threshold resolvability, determining that the media content item is under-locatable. In some examples, the resolvability value is subjected to a normalizing function to provide a normalized resolvability value.

In some examples, the media item is associated with one or more name entities, and the method includes classifying the one or more name entities with one or more tags; and detecting that the media item is under-locatable based in part on the one or more tags. In some examples each tag indicates that the name entity is one of: Dialectical, Neologism, Non-English, Abbreviation, Ambiguous Acronym, Number, Date, Time, Missing Space, Vocable, Non-Replacement Symbol, Orthographically and Semantically Similar Replacement Symbol, Censored, Alternate Spelling, Wordplay, and Proper Noun. In some examples, the one or more tags with which the name entity is classified is used to improve the locatability of the media content item and/or the locatability of one or more other media content items.

In some examples, the method further includes crowdsourcing one or more pronunciation aliases for the name entity or name entities associated with the media item; and associating the one or more pronunciation aliases with the media content item. In some examples, subsequent to the associating the one or more pronunciation aliases with the media content item, the method further includes receiving a locating command including one of the one or more pronunciation aliases; and locating the media content item using one of the one or more pronunciation aliases.

According to further aspects of the present disclosure, a system for detecting an under-locatable media content item includes one or more processors adapted to: ascertain a first number of playbacks of the media content item; ascertain a second number of playbacks of the media content item, where each of the second number of playbacks corresponds to one of the first number of playbacks triggered by a machine voice-driven retrieval of a playback command utterance; and compare the first number to the second number.

According to further aspects of the present disclosure, a non-transitory computer-readable medium includes one or more sequences of instructions that, when executed by one or more processors, causes the one or more processors to detect an under-locatable media content item by: ascertaining a first number of playbacks of the media content item; ascertaining a second number of playbacks of the media content item, where each of the second number of playbacks corresponds to one of the first number of playbacks triggered by a machine voice-driven retrieval of a playback command utterance; and comparing the first number to the second number.

BRIEF DESCRIPTION OF THE DRAWINGS

The features and advantages of the present disclosure will become more apparent from the detailed description set forth below when taken in conjunction with the following drawings. Throughout the several figures and embodiments, like components are referred to by like reference numbers unless otherwise indicated.

FIG. 4 schematically illustrates an embodiment of a look-up table stored on the name entity storage of the system of FIG. 1.

DETAILED DESCRIPTION

The example embodiments presented herein are directed to systems, methods, and non-transitory computer-readable medium products that identify under-locatable media content items and/or improve the locatability of under-locatable media content items. The example embodiments described are for convenience only, and are not intended to limit the application of the present invention. After reading the following description, it will be apparent to one skilled in the relevant art how to implement the following disclosure in alternative embodiments. Such alternative implementations include, for example, systems that store, organize, retrieve, display, or otherwise output any form of digitalized content, such as documents and websites, as well as media content, such as videos, movies, video games, etc., at least in part by machine recognition of utterances.

Figure 1:
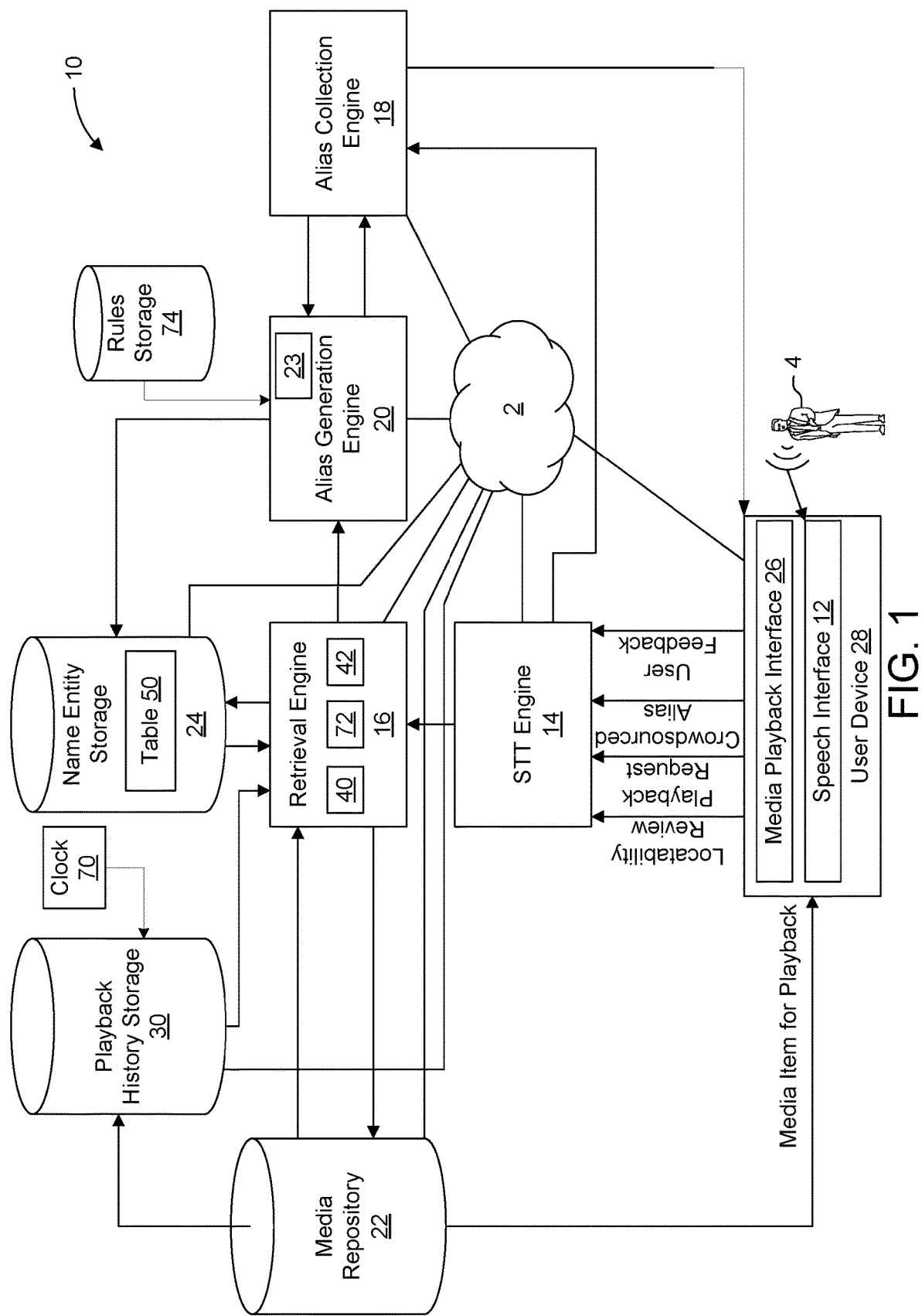
FIG. 1 schematically illustrates components of an example system in accordance with the present disclosure.

FIG. 1 schematically illustrates components of an example system 10 in accordance with the present disclosure. The various components are communicatively coupled, e.g., via a network 2 or through one or more hard electrical and/or electronic connections. The components of the system 10 reside in a single location, or across multiple locations. For example, all of the components reside in a single user device, such as a desktop or a laptop computer, a smart phone, a tablet, a device associated with a vehicle for providing playback of media content in the vehicle, etc. In another example, the components of the system 10 reside in two or more devices, such as a user device, one or more servers positioned remotely from the user device, and/or one or more databases located remotely from the user device and/or the one or more servers.

The system 10 includes a speech interface 12, a speech-to-text (STT) engine 14, a retrieval engine 16, an alias collection engine 18, an alias generation engine 20, a media repository 22, a name entity storage 24, a playback history storage 30, and a media playback interface 26. In some examples, the media playback interface 26 and/or the speech interface 12 is/are associated with a user device 28; in some examples, they are associated with different user devices. In some examples, the user device 28 includes one or more other interfaces, such as a display screen, a key pad for inputting data to and outputting data provided by the system 10.

It should be appreciated that the media repository 22 can include multiple storage devices, e.g., databases, in one or more locations. Similarly, the name entity storage 24 can include multiple storage devices, e.g., databases, in one or more locations. Similarly, the playback history storage 30 can include multiple storage devices, e.g., databases, in one more locations. Alternatively, one or more of the media repository 22, the name entity storage 24, and/or the playback history storage 30 can correspond to a single storage device, e.g., a central server database or other memory.

In a typical playback mode of the system 10, a user 4 utters a playback command or request, e.g., "Play Desert Cactus by the Acmes" which is captured by the speech interface 12. For example, the speech interface 12 includes a microphone, which converts the natural speech into an analog signal. The analog signal is then converted into a digital signal (using one or more analog to digital converters) which is processed by the STT Engine 14.

The STT 14 engine transcribes the digital signal corresponding to the captured natural speech into text. In a typical transcription process, the STT engine 14 translates the speech signal into sound units called phonemes, and then maps the phonemes to words using a stored lexicon of words. In some examples, the context of the words is also used to infer the correct transcription. For example, if the phonemes translated from "Desert Cactus" are imprecise or unclear due to poor transmission or an accent of the user 4, the transcription of "Desert Cactus" by the STT engine 14 may be informed by "by the Acmes" since "Desert Cactus" and "Acmes" often co-occur in a playback utterance. In essence, the STT engine 14 provides a probabilistic transcription based on the available information, and the probability improves as the STT engine 14 learns from experience what words co-occur and at what frequencies. The STT engine 14 can also learn stylizations of specific users. That is, the STT engine 14 learns how to correctly map phonemes depending on the person that has uttered them, thereby taking into account users' individual accents, dialects, rhythm, pace, etc. The STT engine 14 can also learn from feedback, e.g., an input indicating that a particular transcription was correct or incorrect. Thus, in some examples, the STT engine 14 is adapted to access historical records of transcriptions to improve the probability of performing an accurate transcription in the present. Over time, the STT engine's speech recognition tends to improve at least with respect to words that have conventional spellings and pronunciations.

The transcribed playback request is passed to the retrieval engine 16. Using a retrieval module 40, the retrieval engine 16 maps the transcribed request to a media item by identifying one or more entities in the transcription. For example, if the STT engine 14 provides the transcribed text "Play Desert Cactus by the Acmes" the retrieval module 40 parses the text, identifies the name entity "Desert Cactus," and then looks up the name entity in the name entity storage 24. In some examples, the name entity storage 24 includes a look-up table 50 having entries that map each media item stored (e.g., using the media item identifier) in the media repository 22 to one or more name entities and/or one or more aliases associated with the media item identifier (ID). The retrieval module 40 then passes the returned media item ID associated with the name entity to the media repository 22, where the media item associated with the media item ID is identified and then played back, e.g., via the playback interface 26 (e.g., a speaker, a display screen, etc.) of the user device 28.

A record of the playback is stored in the playback history storage 30. The playback record includes the ID of the media item played back and the retrieval modality employed by the user to obtain that particular playback. Example retrieval modalities include utterance (i.e., natural speech) and entered text.

The retrieval engine 16 also includes a retrieval improvement module (RIM) 42. The RIM 42 is configured to ascertain under-locatable name entities associated with media content items stored in the media repository 22. When the RIM 42 is active, the system 10 operates in a retrieval optimization mode. It should be appreciated that the system 10 can operate in both retrieval optimization mode and playback mode at the same time. In some examples, the retrieval module 40 and the RIM 42 are configured to operate asynchronously in order to improve the operating efficiency of the system 10 and reduce overall processing times.

The RIM 42 is triggered by any of a number of triggering events, some examples of which will now be described. In one example, a user-entered command (entered, e.g., via the user device 28) triggers operation of the RIM 42. For instance, a user specifically requests that the RIM 42 perform a specific or general locatabilty review. In another example, the RIM 42 is programmed to undergo preset periodic locatability reviews of name entities associated with media content items stored in the media repository 22. In another example, the RIM 42 is triggered by a user feedback following a media item retrieval (e.g., playback) request. For example, a user feedback of "Not the track I wanted" in response to a playback of a media item ensuing from an uttered playback request triggers the RIM 42 to perform a locatability review of the played back media content item and/or of the correct media content item, e.g., if the user feedback includes a typed entry of the correct media item that was desired.

A locatability review to detect whether a media item is under-locatable is performed by the RIM 42 and can be specific to one or more particular media items, or more general, e.g., performed across the entire collection of media items in the repository 22.

For a given review (whether specific or general) the RIM 42 selects a first media item from the repository 22 by item ID. The RIM 42 then interrogates the playback history storage 30, and counts the total number of past playbacks of the media item, as well as the number of past playbacks of the media item retrieved using the selected name entity via an utterance retrieval modality.

In at least some examples, the playback records are retrieval specific. That is, the item ID associated with each playback record is the item ID that corresponds to the scope of the retrieval request that prompted the playback. Thus, for example, if a track X is part of an album Y, then the playback record of album Y (indicating that a user requested playback of album Y) will have a different item ID in its playback record than a playback of track X by itself (indicating that a user requested playback of track X), even though the playback of album Y includes a playback of the track X. The media item track X may be under-locatable while the album Y that contains track X may be locatable; thus, it is advantageous to differentiate playback records according to the scope of the request that caused their playback.

Figures 2, 3:
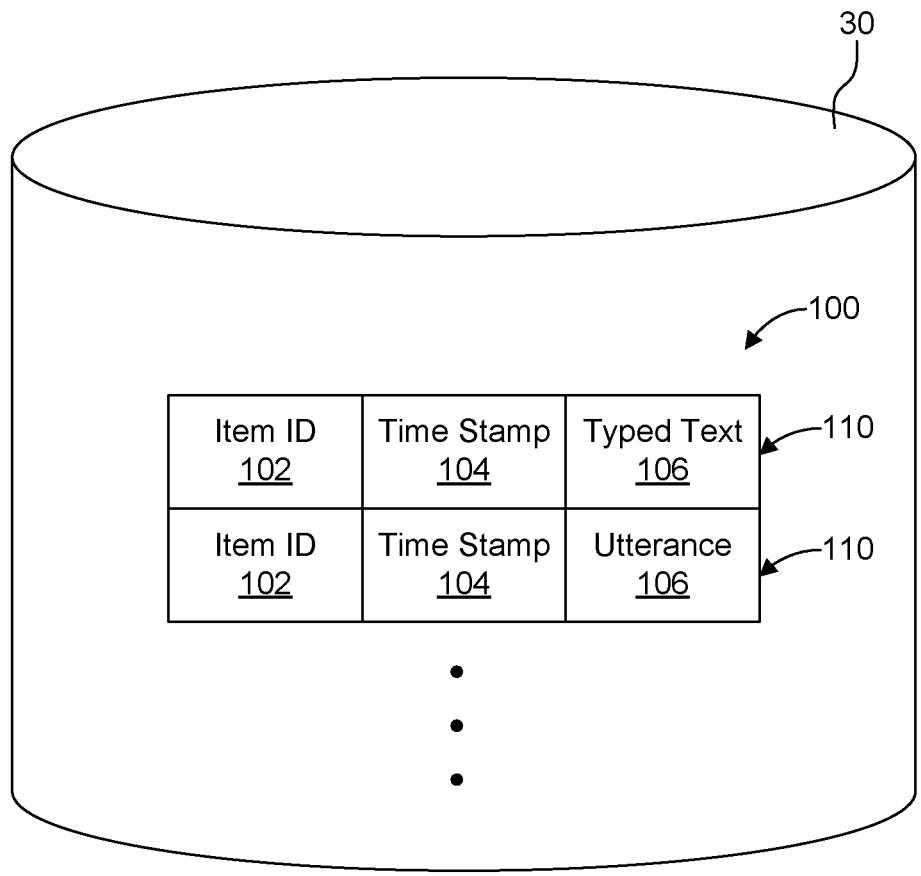
FIG. 2 schematically illustrates playback records in the playback history storage of the system of FIG. 1.
FIG. 3 schematically illustrates an example task item passed to the alias generation engine of the system of FIG. 1.

Example playback records 110 stored in the playback history storage 30 are schematically depicted in FIG. 2. In non-limiting examples, the data of the playback records are stored in a table 100. Each playback record 110 includes at least three associated components: the item ID 102, a time stamp 104 corresponding to when the item having the item ID 102 was retrieved for playback, and the retrieval modality 106. In some examples, the time stamp 104 is applied by a clock 70 (see FIG. 1) of the system 10.

When the RIM 42 interrogates the playback history storage 30 to detect an under-locatable media item, each interrogation is specific to one item ID. Thus, for example, to detect whether track X is under-locatable, the RIM 42 interrogates the playback history storage 30 for playback records having the track X ID, and does not interrogate the playback history storage 30 for playback records having the album Y ID.

In some examples, using, e.g., the time stamps 104, the interrogation is limited by a time frame to ensure that the data reflects recent activity, i.e., playbacks that occurred within a predefined time period, e.g., the past six months. Alternatively, in some examples the playback history storage 30 automatically dumps records that are more than a predefined age, e.g., more than six months old.

Once the total number of playbacks for a given item ID have been counted (e.g., by the counter 72 of the retrieval engine 16), in some examples, the RIM 42 determines if the total number of playbacks meets a predefined minimum threshold number for statistical significance. If the threshold is not reached, the locatability review for the media item is terminated. If the threshold is reached, the RIM 42 then compares the number of past playbacks of the media item retrieved using an utterance retrieval modality to the total number of past playbacks of the media item regardless of the retrieval modality, in order to measure an utterance resolve frequency.

In some examples, the utterance resolve frequency is a ratio of the raw numbers of playbacks of the media item retrieved via a speech retrieval modality to playbacks of the media item regardless of retrieval modality. In other examples, the utterance resolve frequency is a normalized ratio of the raw numbers of playbacks, where the raw number ratio has been subjected to a predefined normalization function. Using a normalized ratio in some examples reduces the impact of data outlier data on utterance resolve frequency. In some examples, an utterance resolve frequency is converted into a resolvability measurement y ("resolvability y") for a given media item. In one example, a normalized equation for the resolvability y of a media item is given by equation (1):

$$y = \log\left(\frac{a}{b+1}\right), \quad (1)$$

where a is the total number of playbacks of the media item prompted by playback requests specific to that media item and regardless of retrieval modality, and b is the total number of playbacks of the media item prompted by playback requests specific to that media item using an utterance retrieval modality. For a given media item, once y has been calculated, the RIM 42 compares it to a predefined threshold resolvability to determine whether the media item is locatable or under-locatable.

For a given media item, the RIM 42 compares the utterance resolve frequency (whether normalized or not) or its calculated resolvability y to a predefined threshold frequency or predefined threshold resolvability, respectively. If the utterance resolve frequency or resolvability y is less than the respective predefined threshold, the media item is determined by the RIM 42 to be under-locatable. If the utterance resolve frequency or resolvability y meets or exceeds the predefined threshold frequency or resolvability, the media item is determined by the RIM 42 to be locatable.

For a media item determined by the RIM 42 to be under-locatable, the media item ID is paired by the RIM 42 with its one or more associated name entities to form a task item that is passed to the alias generation engine 20 for further processing as described below. For example, for a given media item, the RIM 42 retrieves its one or more name entities for the name entity storage 24 by looking up the ID of the media item in the table 50.

In an illustrative example of the capabilities of the RIM 42, the RIM 42 interrogates the playback history storage 30 for the unique media ID XXYYY corresponding to the track 2L8 by artist Sir Acme. A media identifier (ID) XXYYY can be comprised of, for example, alphanumeric characters or other representations that, when processed, link metadata to an associated media content item. The RIM 42 counts (e.g., with the counter 72) the total number of playback records stored in the playback history storage 30 and having the unique media ID XXYYY, counts the total number of playback records stored in the playback history storage 30 having the unique media ID XXYYY and an associated utterance retrieval modality; calculates, using the two counted numbers, a resolvability y, and then compares the calculated resolvability to a predefined threshold resolvability to determine if the media ID XXYYY is locatable or under-locatable. If deemed locatable, then no corrective action is taken. If deemed under-locatable, the RIM 42 pairs the media item ID XXYYY with its one or more associated name entities pulled from the name entity storage 24 to form a task item that is passed to the alias generation engine 20 for further processing as described below.

In another illustrative example of the capabilities of the RIM 42, the RIM 42 interrogates the playback history storage 30 for the unique media ID XXYYY corresponding to the track 2L8 by artist Sir Acme. The RIM 42 counts (e.g., with the counter 72) the total number of playback records stored in the playback history storage 30 and having the unique media ID XXYYY, counts the total number of playback records stored in the playback history storage 30 having the unique media ID XXYYY and an associated utterance retrieval modality; calculates, using the two counted numbers, an utterance resolve frequency, and then compares the calculated utterance resolve frequency to a predefined threshold utterance resolve frequency to determine if the media ID XXYYY is locatable or under-locatable. If deemed locatable, then no corrective action is taken. If deemed under-locatable, the RIM 42 pairs the media item ID XXYYY with its one or more associated name entities pulled from the name entity storage 24 to form a task item that is passed to the alias generation engine 20 for further processing as described below.

In some examples, the RIM classifies the media item ID as something other than locatable or under-locatable, such as "questionable." A questionable media item ID is one for which, e.g., the available data is inconclusive as to whether the media item ID is locatable or under-locatable. This could occur, for example, if there is not a statistically significant number of playback records for the media item, or if the media item was only recently added to the repository 22, or if the media item's name entity is tagged as a typically non-problematic class of name entities despite having a relatively low number of successful utterance retrieval records. Name entity classes and tags will be described in greater detail below.

As described, for a media item determined by the RIM 42 to be under-locatable, the media item ID is paired by the RIM 42 with its one or more associated name entities from the table 50 to form a task item that is passed to the alias generation engine 20.

For example, for a given media item, the RIM 42 retrieves its one or more name entities from the name entity storage 24 by looking up the ID of the media item in the table 50.

An example task item 120 is schematically illustrated in FIG. 3. The task item 120 includes at least two components: the item ID 122 and any associated name entities 124 matching the item ID 122. In some examples, the task item 120 also includes a filled or fillable classification cell 126. In some examples, the task item 120 also includes a filled or fillable alias cell 128.

Using the track 2L8 by Sir Acme as an example where that content item has been determined by the RIM 42 (FIG. 1) to be under-locatable, a task item 120 is generated where the item ID 122 corresponds to the content ID of the track 2L8, the name entities cell 124 is populated with the name entity "2L8", and the classification cell 126 and alias cell 128 are unpopulated because no prior aliases or classifications have been generated for the name entity "2L8". This could occur, for example, if the track 2L8 is a relatively newly introduced media item to the repository 22 (FIG. 1), and so locatability detection has not been previously performed on this particular media item.

Referring to FIGS. 1 and 3, the RIM 42 passes the task item 120 to the alias generation engine 20, which collects one or more aliases for the name entity of the media item corresponding to the ID 122 using the alias collection engine 18. In at least some examples, the alias collection engine 18 collects aliases by crowd-sourcing uttered aliases via an interface of the user device 28 or any other user device communicatively coupled to the alias collection engine 18, such as the user devices of a plurality of users of the system 10.

For example, the alias collection engine generates an output that appears as text on a user interface. The text includes the name entity of the media item (in this case, "2L8" or "2L8 by Sir Acme") and invites the user to utter the name entity, the utterance being received through the interface. For example, the text reads: "Say 'play 2L8 by Sir Acme'" once. The crowd-sourced utterances are then transmitted via the speech interface 12 of the user device 28 (or another user device) to the STT engine 14, which transcribes the crowd-sourced utterances and provides them to the alias collection engine 18. The alias collection engine 18 then populates the aliases cell 128 of the task item 120 with the collected transcribed aliases and returns the updated task item to the alias generation engine 20. In some examples, in order for a crowd-sourced transcribed alias to populate the aliases cell 128, it must have occurred at least a predefined minimum number of times.

For example, in response to receiving, for each of two aliases, at least a predefined minimum number of responses to crowd-sourcing pronunciations for "2L8", the alias collection engine 18 populates the aliases cell 128 of the task item 120 with "too late" and "too-el-ate" corresponding to two crowd-sourced pronunciation aliases. It should be appreciated that each alias can be represented in the aliases cell 128 in more than one way, i.e., as alternative but equivalent or at least substantially equivalent spellings to ensure that minor variations in speech transcription by the STT engine 14 are nevertheless mapped to the appropriate alias.

It should be appreciated that aliases can be collected without crowd-sourcing. For example, specific user accounts can be targeted to provide aliases, or the artists themselves can be targeted to provide aliases.

The alias collection engine 18 passes the updated task item 120 to the alias generation engine 20. In some examples, the alias generation engine 20 then classifies the content item and populates the classification cell 126 with one or more tags corresponding to the classification. In some examples, the alias generation engine 20 classifies the content item based at least in part on the aliases that have been collected. In some examples, the alias generation engine 20 classifies the content item based at least in part on the name entity of the content item. In still further examples, the alias generation engine 20 classifies the content item based at least in part on the aliases that have been collected and comparing the collected aliases from the cell 128 to the one or more name entities from the cell 124.

For example, the alias generation engine 20 compares the aliases "too late" and "too-el-ate" to the name entity "2L8" and determines that the media item should be classified as an "Alternative Spelling." Non-limiting examples of classifications will be described below.

In some examples, the alias generation engine 20 uses the classifications and/or aliases for one or more name entities to generalize rules for determining aliases for other name entities without the need for crowd-sourcing pronunciations. In some examples, the rules are stored in a rules storage 74 (e.g., a database), as shown in FIG. 1, and accessed by the alias generation engine 20. The alias generation engine 20 uses the classifications and/or aliases in a machine learning model 23 to generate and apply alias generation rules for other name entities and content items. For example, using 2L8's aliases and classification, the alias generation engine 20 generates a rule stored in the rules storage 74 for determining a generalized alias for "Alternative Spelling" name entities in which a number in the name entity is phonetically spelled out. The alias generation engine 20 can then use the stored rule to generate one or more aliases for another media item having a name entity classified as "Alternative Spelling" and containing a number. Thus, it should be appreciated that, in some examples, the alias generation engine 20 generates one or more aliases for a detected under-locatable name entity without using the alias collection engine 18 to collect aliases by crowd-sourcing or another collection means.

In some examples, the alias generation engine 20 and/or the retrieval engine 16 uses one or more rules to directly classify a particular name entity and provide that classification to the table 50 independently of generating or collecting any aliases for that name entity. For example, the retrieval engine 16 identifies a character in a name entity that is not a letter, and the media item associated with that name entity is correspondingly tagged in the classification column 156 of the table 50.

From the updated task item 120 including the collected and/or generated aliases, the table 50 in the name entity storage 24 is then updated to include the collected and/or generated aliases associated with the content item ID. Subsequently, when the system 10 is in playback mode a transcribed uttered playback request is compared by the retrieval engine 16 to the name entity and any associated aliases of that name entity when identifying in the table 50 a content item ID corresponding to the playback request. For example, a subsequent transcribed uttered request to "play too late" is correctly mapped to the name entity 2L8 and its corresponding content ID in the table 50 using the collected or generated alias "too late".

An illustration of an example embodiment of the table 50 is illustrated in FIG. 4. The table 50 includes a content ID column 150, a name entity column 152, and an alias column 154. Optionally, it also includes a classification tag column 156. A content item ID is located by retrieval engine 16 by matching up the corresponding name entity or alias to a transcribed utterance in the table 50.

The following classifications of media content name entities are non-limiting and for illustration purposes only. As mentioned, in some examples, the alias generation engine 20 generates one or more aliases for a name entity at least in part based on the name entity's classification.

One example name entity classification is English dialects and neologisms. In this classification, a name entity uses one or more new words that may contribute to a dialect or that are spelled in a way intended to convey a certain dialect of English speech. An example is the name entity "She Da Best". The determiner "da" in "She Da Best" is spoken distinctly from the Standard American English equivalent "the". Typical machine voice-driven retrieval systems can fail to correctly form this dialect speech and often change it to Standard American English.

Another example name entity classification is abbreviations and ambiguous acronyms. Abbreviations and ambiguous acronyms consist of name entities that include shortened or abbreviated words in their titles or textual cues that imply abbreviation or acronym. An example of a true acronym name entity is "B.Y.O.B.". Abbreviations are often ambiguous in their pronunciation. An example of an ambiguous name entity is "BILD". While "BILD" may be intended solely as an alternative spelling (for "build"), users may interpret the capitalization cues to imply that they should pronounce each letter individually.

Another example name entity is classification is numbers, dates, and times, examples being the name entity "$2^{nd}$ Birthday". Similar to the abbreviations class, there is a risk of users resorting to utterances having multiple textual representations of the same spoken phrases. For example, "$2^{nd}$ Birthday" could also be transcribed as "Second Birthday". Similarly, times can be represented in different ways, e.g., 'seven hundred hours' may be uttered instead of 'Seven AM' or '7 o'clock'. Similarly, dates can be represented in different ways, e.g., '7/11' could be 'Seven eleven', 'July Eleventh', or 'November Seventh'.

Another example name entity is classification is removal of spaces. Removing spaces in name entities can present challenges for machine voice-driven retrieval, such as in the name entity "TREEFALL". Removing spaces can prevent a transcribed utterance from being mapped to the appropriate name entity.

Another example name entity classification is vocables. Vocables are utterances that are not words but do contain meaning. Commonly used examples in everyday language are 'uh-huh' to agree with something and 'ew' to express disgust. Many lexicons of automatic speech recognition systems do not include many vocables, thereby causing a name entity including such a vocable to be under-locatable.

Another example name entity classification that can cause under-locatability of that name entity is non-replacement symbols, i.e., name entities containing one or symbols e.g., for conveying a specific feeling, such as the name entity $Opportunity$.

Another example name entity classification that can cause under-locatability of that name entity is orthographically and semantically similar replacement symbols, such as name entities that use the symbol "▲" instead of an "A".

Another example name entity classification that can cause under-locatability of that name entity is expressive and alternative spellings. Alternative spellings are not intended to modify the pronunciation of the word. For example, "Bild me up" is still intended to be pronounced the same as "Build me up". Alternative spellings may cause under-locatability because the actual name entity can be substantially different from the transcription that the automatic speech recognition system produces. Combinations of alternative spelling and dialects may be particularly challenging to locate.

Another example name entity classification that can cause under-locatability of that name entity is wordplay, such as homophones, puns and portmanteau. For example, the artist "Knowmansland" may be under-locatable by an automatic speech recognition system that transcribes a corresponding playback request as "no man's land".

Another example name entity classification that can cause under-locatability of that name entity is proper nouns due to the plurality of spelling and pronunciation differences commonly used.

As described above, once a name entity has been classified the media item associated with that name entity is tagged with the one or more classifications. For example, the task item 120 (FIG. 3) is updated with the classification tag or tags, which is then used to update the classification tag column 156 of the table 50 (FIG. 4).

Name entities that have been so tagged can inform generalizable alias generation by the alias generation engine 20. In addition, name entities that have been so tagged can inform the RIM 42 at least in part as to whether a particular media item is locatable or under-locatable. For example, if there is limited data from which the RIM 42 can calculate an utterance resolve frequency for a given media item but the data that is available suggests that the media item is under-locatable, the RIM 42 can nevertheless determine that the media item is locatable if the name entity associated with the media item does not fall within any predefined classifications known to be associated with under-locatability.

Figure 5:
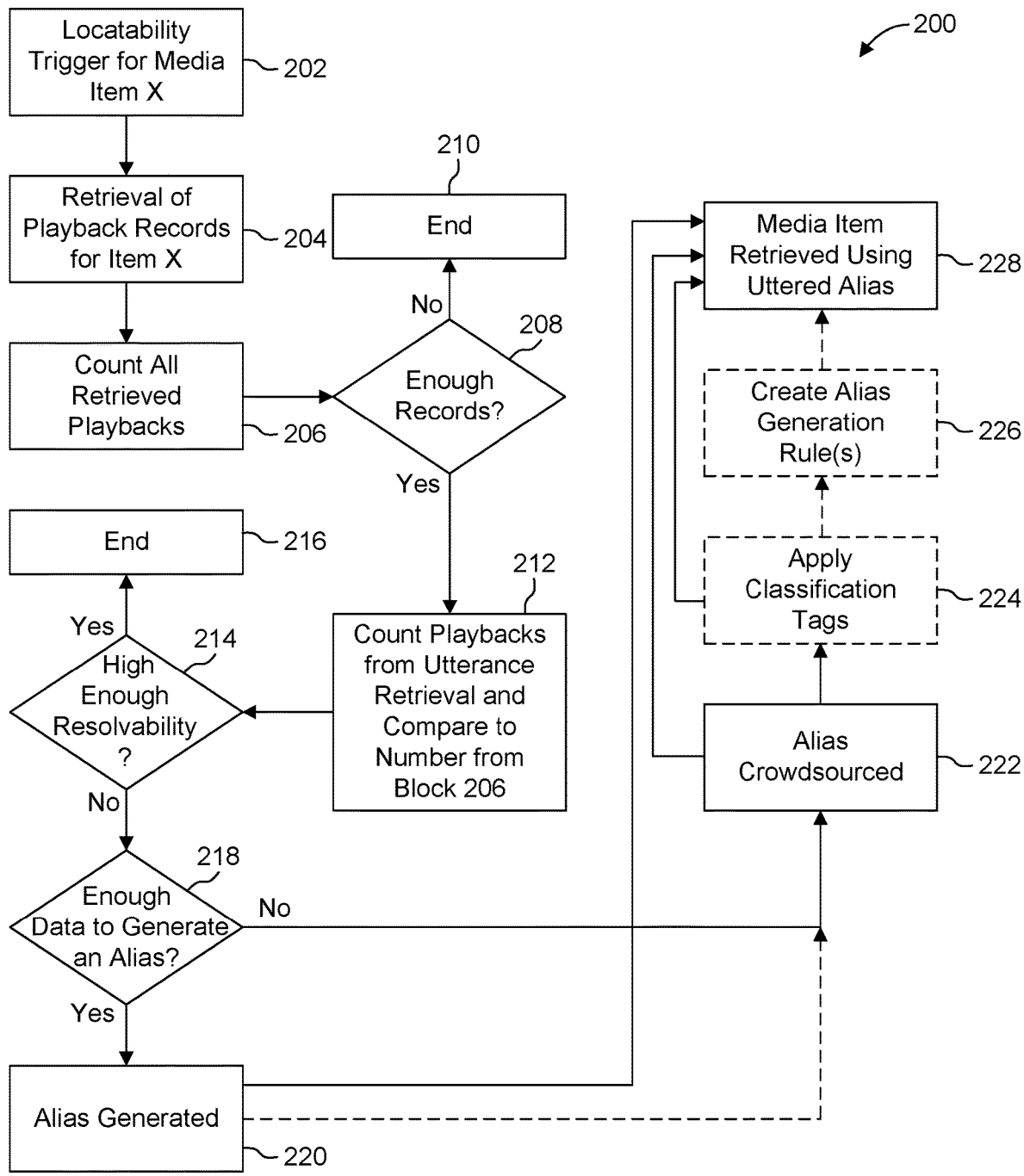
FIG. 5 schematically illustrates an example process flow for the system of FIG. 1.

FIG. 5 schematically illustrates an example process flow 200 for the system 10 of FIG. 1.

Referring to the flow 200, at a block 202 a locatability detection for a media item X is triggered. Non-limiting example triggering events include: a user-entered command to perform locatability detection on the particular media item X; a preset periodic locatability detection of the media item X; and a user feedback following a media item playback request for the media item X or another media item.

The locability trigger causes, at block 204, a retrieval of playback records specific to the media item X or a retrieval of a sufficiently recent playback records specific to the media item X.

At block 206, all of the retrieved playback records are counted, corresponding to all playback records specific to the media item X regardless of retrieval modality.

At block 208, the number counted at block 206 is compared to a predefined threshold minimum number of playback records. If the counted number is smaller than the predefined minimum then at block 210 the flow 200 ends. If the counted number is at least as large as the predefined minimum then at block 212, a number of counted playback records corresponding to retrievals by utterance is counted and compared to the number obtained at block 206 to obtain a resolvability value for the media item X. In some examples, the resolvability value is normalized according to a normalizing function.

At block 214, if the resolvability value is larger than a predefined maximum threshold number, the content entity is determined to be locatable and the process flow ends at block 216. If the resolvability value is not larger than the predefined maximum, then at block 218 it is determined if there is sufficient data about the media item to generate a pronunciation alias. Such data includes, for example, a classification tag associated with the media item. The classification tag may be pre-associated with the media item, generated at block 218, or generated at block 224 and used for a subsequent process flow for the same media item.

If there is enough data to generate a pronunciation alias, at block 220 a pronunciation alias is generated and associated with the media item. Optionally, the flow then proceeds to block 222 or skips to block 228.

If there is not enough data to generate a pronunciation alias, the flow proceeds from block 218 to block 222, where one or more pronunciation aliases for the media item are crowdsourced and associated with the media item. From block 222, the flow 200 optionally proceeds to block 224; otherwise it proceeds to block 228.

At block 224, the one or more crowd-sourced aliases are used to apply one or more classification tags to the media item.

From block 224, the flow 200 optionally proceeds to block 226; otherwise, it proceeds to block 228.

At block 226, one or more generalized alias generation rules are created using the one or more classification tags from block 224 and/or one or more name entities already associated with the media item.

From block 226, the flow 200 proceeds to block 228. At block 228 the media item is retrieved and played back using an utterance retrieval modality that includes in the utterance a generated alias from block 220 or a crowd-sourced alias from block 222.

It should be appreciated that blocks 202, 204, 206, 208, 210, 212, 214, 216, 218, 220, 222, 224, and 226 correspond to a retrieval optimization mode of the system 10 of FIG. 1, while block 228 corresponds to a playback mode of the system 10. Thus, it should be appreciated that retrieval optimization improves playback mode.

FIG. 5 is a block diagram showing an exemplary device 500 constructed to realize one or more aspects of the example embodiments described herein. In some examples, the device 500 corresponds to the user device 28. In these examples, the device 28 may be connected over the network 2 to one or more servers 502 or other remote devices. The one or more servers 502 can include one or more components described below in relation to the device 500, including a mass storage device and a processor device. That is, various operations and processes described herein can be performed by the cooperation of two or more devices, systems, processes, or combinations thereof. Such a division of operations provides for efficient use of computing resources because servers are generally more powerful than the user device 28.

The device 500 includes a processing device 510. Also included are a main memory 525 and an interconnect bus 505. The processor device 510 may include without limitation a single microprocessor, or may include a plurality of microprocessors for configuring the device 500 for media content locatability detection and improvement. The main memory 525 stores, among other things, instructions and/or data for execution by the processor device 510. The main memory 525 may include banks of dynamic random access memory (DRAM), as well as cache memory.

Figure 6:
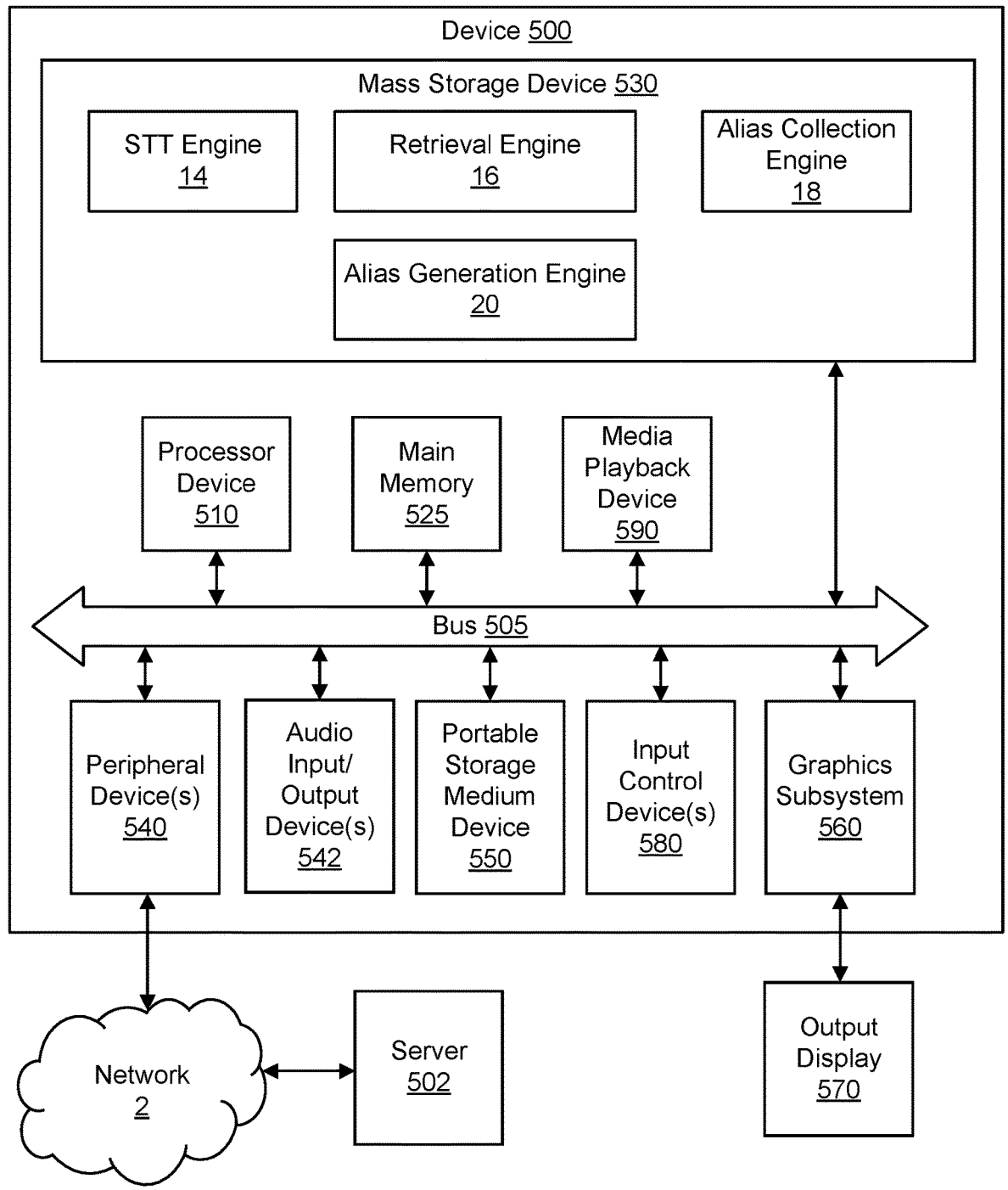
FIG. 6 is a block diagram showing an exemplary device constructed to realize one or more aspects of the example embodiments described herein.

The device 500 may further include a mass storage device 530, peripheral device(s) 540, audio input/output device(s) 542 (e.g., a microphone, speaker), portable non-transitory storage medium device(s) 550, input control device(s) 580, a media playback device 590 (e.g., a speaker), a graphics subsystem 560, and/or an output display interface 570. For explanatory purposes, all components in the device 500 are shown in FIG. 6 as being coupled via the bus 505. However, the device 500 is not so limited. Elements of the device 500 may be coupled via one or more data transport means. For example, the processor device 510, and/or the main memory 525 may be coupled via a local microprocessor bus. The mass storage device 530, peripheral device(s) 540, portable storage medium device(s) 550, and/or graphics subsystem 560 may be coupled via one or more input/output (I/O) buses. The mass storage device 530 may be a nonvolatile storage device for storing data and/or instructions for use by the processor device 510. The mass storage device 530 can also correspond to one or more of the media repository 22, the playback history storage 30, the rules database 72, and the name entity storage 24 described above. The mass storage device 530 may be implemented, for example, with a magnetic disk drive or an optical disk drive. In a software embodiment, the mass storage device 530 is configured for loading contents of the mass storage device 530 into the main memory 525. Memory may be embodied as one or more of mass storage device 530, main memory 525, or portable storage medium device 550.

Mass storage device 530 may additionally store the STT engine 14, the retrieval engine 16, the alias generation engine 20, and/or the alias collection engine 18. The mass storage device 530 may also include software that, when executed, causes the device 500 to perform the features described above, including but not limited to the functions of the STT engine 14, the retrieval engine 16, the alias generation engine 20, and/or the alias collection engine 18.

The portable storage medium device 550 operates in conjunction with a nonvolatile portable storage medium, such as, for example, a solid state drive (SSD), to input and output data and code to and from the device 500. In some embodiments, the software for storing information may be stored on a portable storage medium, and may be inputted into the device 500 via the portable storage medium device 550. The peripheral device(s) 540 may include any type of computer support device, such as, for example, an input/output (I/O) interface configured to add additional functionality to the device 500. For example, the peripheral device(s) 540 may include a network interface card for interfacing the device 500 with a network 2. The audio input/output devices 542 may correspond to the interfaces 12 and/or 26 and may include a microphone and/or speaker.

The input control device(s) 580 provide a portion of an interface for the device 500. The input control device(s) 580 may include a keypad and/or a cursor control and/or a touch screen. The keypad may be configured for inputting alphanumeric characters and/or other key information. The cursor control device may include, for example, a handheld controller or mouse, a rotary input mechanism, a trackball, a stylus, and/or cursor direction keys. In order to display textual and graphical information, the device 500 may include the graphics subsystem 560 and the output display 570. The output display 570 may include a display such as a TFT (Thin Film Transistor), TFD (Thin Film Diode), OLED (Organic Light-Emitting Diode), AMOLED display (active-matrix organic light-emitting diode), and/or liquid crystal display (LCD)-type displays. The displays can also be touchscreen displays, such as capacitive and resistive-type touchscreen displays.

The graphics subsystem 560 receives text-based and graphical information, and processes the information for output to the output display 570, such as textual requests for uttered aliases.

Input control devices 580 can control the operation and various functions of device 500. Input control devices 580 can include any components, circuitry, or logic operative to drive the functionality of device 500. For example, input control device(s) 580 can include one or more processors acting under the control of an application.

Each component of the device 500 may represent a broad category of a computer component of a general and/or special purpose computer. Components of the device 500 are not limited to the specific implementations provided herein.

Software embodiments of the examples presented herein may be provided as a computer program product, or software that may include an article of manufacture on a machine-accessible or machine-readable media having instructions. The instructions on the non-transitory machine-accessible machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine, and which causes the machine to perform any one of the methods described herein. Further, it is common in the art to speak of software, in one form or another (e.g., program, procedure, process, application, module, engine, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein that can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A method for detecting an under-locatable media content item comprising:
   ascertaining a first number of playbacks of a media content item;
   ascertaining a second number of playbacks of the media content item, where each of the second number of playbacks corresponds to one of the first number of playbacks triggered by a machine voice-driven retrieval of a playback command utterance; and
   comparing the first number of playbacks to the second number of playbacks to: 1) generate a resolvability value for the media content item and compare the resolvability value to a predefined threshold resolvability value and, if the resolvability value is less than the predefined threshold resolvability value, determine that the media content item is under-locatable; or 2) generate an utterance resolve frequency for the media content item and compare the utterance resolve frequency to a predefined threshold frequency and, if the utterance resolve frequency is less than the predefined threshold frequency, determine that the media content item is under-locatable.

2. The method of claim 1, wherein each of the first number of playbacks of the media content item corresponds to a playback command provided by any of a plurality of command modalities, wherein one of the command modalities is natural speech and another of the command modalities is text.

3. The method of claim 1,
wherein the media content item is associated with one or more name entities, and the method further comprises:
classifying the one or more name entities with one or more tags, each of the one or more tags corresponding to a class of name entities that are under-locatable by machine voice-driven retrieval.

4. The method of claim 3, further comprising:
generating at least one pronunciation alias for the one or more name entities;
wherein the generating is based at least partially on the one or more tags.

5. The method of claim 4, further comprising:
locating the media content item using a machine voice-driven retrieval of an utterance containing the at least one pronunciation alias; and
playing back the located media content item.

6. The method of claim 1, further comprising:
collecting at least one pronunciation alias for one or more name entities; and
associating a transcription of at least one pronunciation alias with the media content item.

7. The method of claim 6, further comprising:
locating the media content item using a machine voice-driven retrieval of an utterance containing the at least one pronunciation alias; and
playing back the located media content item.

8. A system for detecting an under-locatable media content item, comprising:
one or more processors adapted to:
ascertain a first number of playbacks of a media content item;
ascertain a second number of playbacks of the media content item, where each of the second number of playbacks corresponds to one of the first number of playbacks triggered by a machine voice-driven retrieval of a playback command utterance; and
compare the first number of playbacks to the second number of playbacks to: 1) generate a resolvability value for the media content item and compare the resolvability value to a predefined threshold resolvability value and, if the resolvability value is less than the predefined threshold resolvability value, determine that the media content item is under-locatable; or 2) generate an utterance resolve frequency for the media content item and compare the utterance resolve frequency to a predefined threshold frequency and, if the utterance resolve frequency is less than the predefined threshold frequency, determine that the media content item is under-locatable.

9. The system of claim 8, wherein each of the first number of playbacks of the media content item corresponds to a playback command provided by any of a plurality of command modalities, wherein one of the command modalities is natural speech and another of the command modalities is text.

10. The system of claim 8,
wherein the media content item is associated with one or more name entities, and the one or more processors are further adapted to:
classify the one or more name entities with one or more tags, each of the one or more tags corresponding to a class of name entities that are under-locatable by machine voice-driven retrieval.

11. The system of claim 10, wherein the one or more processors are further adapted to:
generate at least one pronunciation alias for the one or more name entities;
wherein the generate is based at least partially on the one or more tags.

12. The system of claim 10, wherein the one or more processors are further adapted to:
locate the media content item using a machine voice-driven retrieval of an utterance containing at least one pronunciation alias; and
play back the located media content item.

13. The system of claim 8, wherein the one or more processors are further adapted to:
collect at least one pronunciation alias for the one or more name entities; and
associate a transcription of at least one pronunciation alias with the media content item.

14. The system of claim 13, wherein the one or more processors are further adapted to:
locate the media content item using a machine voice-driven retrieval of an utterance containing the at least one pronunciation alias; and
play back the located media content item.

15. A non-transitory computer-readable medium, comprising:
one or more sequences of instructions that, when executed by one or more processors, causes the one or more processors to detect an under-locatable media content item by:
ascertaining a first number of playbacks of a media content item;
ascertaining a second number of playbacks of the media content item, where each of the second number of playbacks corresponds to one of the first number of playbacks triggered by a machine voice-driven retrieval of a playback command utterance; and
comparing the first number of playbacks to the second number of playbacks to: 1) generate a resolvability value for the media content item and compare the resolvability value to a predefined threshold resolvability value and, if the resolvability value is less than the predefined threshold resolvability value, determine that the media content item is under-locatable; or 2) generate an utterance resolve frequency for the media content item and compare the utterance resolve frequency to a predefined threshold frequency and, if the utterance resolve frequency is less than the predefined threshold frequency, determine that the media content item is under-locatable.

16. The non-transitory computer-readable medium of claim 15, wherein each of the first number of playbacks of the media content item corresponds to a playback command provided by any of a plurality of command modalities, wherein one of the command modalities is natural speech and another of the command modalities is text.

17. The non-transitory computer-readable medium of claim 15, wherein the media content item is associated with one or more name entities, and wherein the one or more sequences of instructions, when executed by the one or more processors, causes the one or more processors to:
classify the one or more name entities with one or more tags, each of the one or more tags corresponding to a class of name entities that are under-locatable by machine voice-driven retrieval.

18. The non-transitory computer-readable medium of claim 17, wherein the one or more sequences of instructions, when executed by the one or more processors, causes the one or more processors to:
generate at least one pronunciation alias for the one or more name entities;
wherein the generate is based at least partially on the one or more tags.

19. The non-transitory computer-readable medium of claim 18, wherein the one or more sequences of instructions, when executed by the one or more processors, causes the one or more processors to:
locate the media content item using a machine voice-driven retrieval of an utterance containing the at least one pronunciation alias; and
play back the located media content item.

20. The non-transitory computer-readable medium of claim 15, wherein the one or more sequences of instructions, when executed by the one or more processors, causes the one or more processors to:
collect at least one pronunciation alias for one or more name entities; and
associate a transcription of the at least one pronunciation alias with the media content item.

21. The non-transitory computer-readable medium of claim 20, wherein the one or more sequences of instructions, when executed by the one or more processors, causes the one or more processors to:
locate the media content item using a machine voice-driven retrieval of an utterance containing the at least one pronunciation alias; and
play back the located media content item.

22. A method for detecting an under-locatable media content item comprising:
ascertaining a first number of playbacks of a media content item, wherein the media content item is associated with one or more name entities;
ascertaining a second number of playbacks of the media content item, where each of the second number of playbacks corresponds to one of the first number of playbacks triggered by a machine voice-driven retrieval of a playback command utterance;
comparing the first number of playbacks to the second number of playbacks to generate: 1) a resolvability value for the media content item; or 2) an utterance resolve frequency for the media content item; and
classifying the one or more name entities with one or more tags, each of the one or more tags corresponding to a class of name entities that are under-locatable by machine voice-driven retrieval.

23. The method of claim 22, wherein each of the first number of playbacks of the media content item corresponds to a playback command provided by any of a plurality of command modalities, wherein one of the command modalities is natural speech and another of the command modalities is text.

24. The method of claim 22, further comprising:
1) comparing the utterance resolve frequency to a predefined threshold frequency and, if the utterance resolve frequency is less than the predefined threshold frequency, determining that the media content item is under-locatable; or
2) comparing the resolvability value to a predefined threshold resolvability value and, if the resolvability value is less than the predefined threshold resolvability value, determine that the media content item is under-locatable.

25. The method of claim 22, further comprising:
generating at least one pronunciation alias for the one or more name entities;
wherein the generating is based at least partially on the one or more tags.

26. The method of claim 25, further comprising:
locating the media content item using a machine voice-driven retrieval of an utterance containing the at least one pronunciation alias; and
playing back the located media content item.

27. The method of claim 22, further comprising:
collecting at least one pronunciation alias for the one or more name entities; and
associating a transcription of the at least one pronunciation alias with the media content item.

28. The method of claim 27, further comprising:
locating the media content item using a machine voice-driven retrieval of an utterance containing the at least one pronunciation alias; and
playing back the located media content item.

29. A system for detecting an under-locatable media content item, comprising:
one or more processors adapted to:
ascertain a first number of playbacks of a media content item, wherein the media content item is associated with one or more name entities;
ascertain a second number of playbacks of the media content item, where each of the second number of playbacks corresponds to one of the first number of playbacks triggered by a machine voice-driven retrieval of a playback command utterance;
compare the first number of playbacks to the second number of playbacks to generate: 1) a resolvability value for the media content item; or 2) an utterance resolve frequency for the media content item; and
classify the one or more name entities with one or more tags, each of the one or more tags corresponding to a class of name entities that are under-locatable by machine voice-driven retrieval.

30. The system of claim 29, wherein each of the first number of playbacks of the media content item corresponds to a playback command provided by any of a plurality of command modalities, wherein one of the command modalities is natural speech and another of the command modalities is text.

31. The system of claim 29, wherein the one or more processors are further adapted to:
1) compare the utterance resolve frequency to a predefined threshold frequency and, if the utterance resolve frequency is less than the predefined threshold frequency, determine that the media content item is under-locatable; or
2) compare the resolvability value to a predefined threshold resolvability value and, if the resolvability value is less than the predefined threshold resolvability value, determine that the media content item is under-locatable.

32. The system of claim 29, wherein the one or more processors are further adapted to:
generate at least one pronunciation alias for the one or more name entities;
wherein the generate is based at least partially on the one or more tags.

33. The system of claim 29, wherein the one or more processors are further adapted to:
locate the media content item using a machine voice-driven retrieval of an utterance containing at least one pronunciation alias; and
play back the located media content item.

34. The system of claim 29, wherein the one or more processors are further adapted to:
collect at least one pronunciation alias for the one or more name entities; and
associate a transcription of the at least one pronunciation alias with the media content item.

35. The system of claim 34, wherein the one or more processors are further adapted to:
locate the media content item using a machine voice-driven retrieval of an utterance containing the at least one pronunciation alias; and
play back the located media content item.

36. A non-transitory computer-readable medium, comprising:
one or more sequences of instructions that, when executed by one or more processors, causes the one or more processors to detect an under-locatable media content item by:
ascertaining a first number of playbacks of a media content item, wherein the media content item is associated with one or more name entities;
ascertaining a second number of playbacks of the media content item, where each of the second number of playbacks corresponds to one of the first number of playbacks triggered by a machine voice-driven retrieval of a playback command utterance;
comparing the first number of playbacks to the second number of playbacks to generate: 1) a resolvability value for the media content item; or 2) an utterance resolve frequency for the media content item; and
classifying the one or more name entities with one or more tags, each of the one or more tags corresponding to a class of name entities that are under-locatable by machine voice-driven retrieval.

37. The non-transitory computer-readable medium of claim 36, wherein each of the first number of playbacks of the media content item corresponds to a playback command provided by any of a plurality of command modalities, wherein one of the command modalities is natural speech and another of the command modalities is text.

38. The non-transitory computer-readable medium of claim 36, wherein the one or more sequences of instructions, when executed by the one or more processors, causes the one or more processors to:
1) compare the utterance resolve frequency to a predefined threshold frequency and, if the utterance resolve frequency is less than the predefined threshold frequency, determine that the media content item is under-locatable; or
2) compare the resolvability value to a predefined threshold resolvability value and, if the resolvability value is less than the predefined threshold resolvability value, determine that the media content item is under-locatable.

39. The non-transitory computer-readable medium of claim 36, wherein the one or more sequences of instructions, when executed by the one or more processors, causes the one or more processors to:
generate at least one pronunciation alias for the one or more name entities;
wherein the generate is based at least partially on the one or more tags.

40. The non-transitory computer-readable medium of claim 36, wherein the one or more sequences of instructions, when executed by the one or more processors, causes the one or more processors to:
locate the media content item using a machine voice-driven retrieval of an utterance containing at least one pronunciation alias; and
play back the located media content item.

41. The non-transitory computer-readable medium of claim 36, wherein the one or more sequences of instructions, when executed by the one or more processors, causes the one or more processors to:
collect at least one pronunciation alias for the one or more name entities; and
associate a transcription of the at least one pronunciation alias with the media content item.

42. The non-transitory computer-readable medium of claim 41, wherein the one or more sequences of instructions, when executed by the one or more processors, causes the one or more processors to:
locate the media content item using a machine voice-driven retrieval of an utterance containing the at least one pronunciation alias; and
play back the located media content item.

* * * * *